April 1, 1930. D. CANTER 1,752,729

ICE CREAM CONE

Filed March 18, 1929

Inventor
David Canter
by Benjamin H. Chertok
Attorney

Patented Apr. 1, 1930

1,752,729

UNITED STATES PATENT OFFICE

DAVID CANTER, OF MATTAPAN, MASSACHUSETTS

ICE-CREAM CONE

Application filed March 18, 1929. Serial No. 347,989.

This invention relates to ice cream cones and has for its principal object to provide a twin cone with individual points or stems which while possessing all the advantages of the conventional cone now generally accepted as standard in the trade will, however, embody new features representing both radical departure from accepted design as well as new possibilities in the serving of ice cream. As such my cone is distinctive, both in design and in utility.

According to my invention, the cone is so designed as to present a plurality of contiguous but definitely independent compartments of general conical form adapted to receive individual fillings of ice cream and to maintain such fillings in relative independent assembly during the consumption of the cone. This not only enables fillings of different flavors to be placed in different compartments, but permits them independently to be maintained. The cone may be molded to present any desired number of individual compartments of any desired configuration, and these compartments may be arranged in any desired relation to each other.

As illustrative of the principles of my invention as well as indicating obvious variations thereof, I show in the accompanying drawings a preferred embodiment and several modifications.

As with the usual ice cream cone, my cone is made of an edible farinaceous batter molded to the desired shape and baked.

Figure 1:
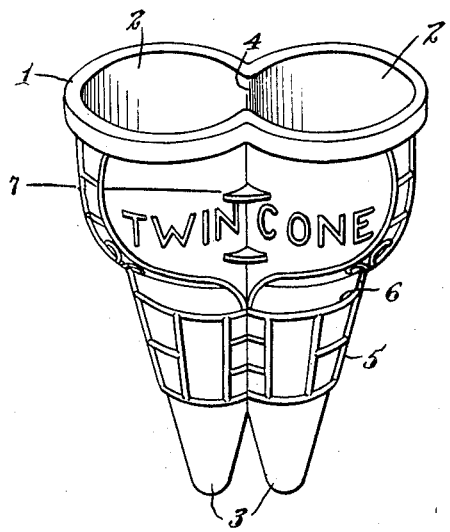
Figure 1 is a perspective view of a preferred form.
Figure 2:
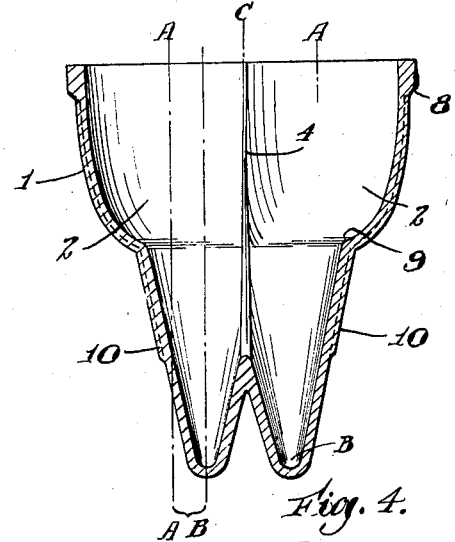
Figure 2 is a longitudinal section thereof.

Referring to Figures 1 and 2, I have shown a twin cone with individual points or stems. As such it presents a continuous shell 1 which is shaped to define a pair of oppositely disposed substantially cylindrical compartments 2 of generally conical shape having wide flaring open tops and tapering to narrow closed bottom points or stems 3 by means of which the cone as a unit may be grasped and held. The compartments 2 are contiguous, but definitely distinct from each other, the lines of separation being indicated at 4 and gradually merging into each other intermediate of the stems at the bottom of the cone.

Where the compartments are substantially circular, the generative centers of the compartments may be considered to be the points A, and those of the tapered stems as the points B. It will be noted that the stems are thus definitely inset towards the mathematical center C of the cone, the degree of insetting being substantially the distance A B indicated in Figure 2. By thus inwardly offsetting these stems with relation to the compartments 2 the cone is strengthened and reenforced. This feature is carried out in several other designs shown by way of modification and adds considerably to the strength of the cone as well as bringing all of the stems more closely together, thus enabling them to be more easily grasped as a unit.

For greater strength, the cone may be provided with vertical ribs 5 and horizontal ribs 6 and also with one or more, here shown as two spaced cross ribs 7 which act as ties across the vertical ribs 4 separating the compartments 2.

Preferably the mold is so shaped as to provide each compartment just below its open mouth with an overhanging lip 8 and near the bottoms of the compartments with internal shoulders 9. In fact, the compartments proper may be said to terminate at these shoulders and the stems 3 may be said to begin at these shoulders, said stems tapering towards each other as shown in the drawing to produce the insetting hereinbefore described.

The arrangement of external strengthening ribs may be in any desired pattern so as to produce any desired external design.

Figure 3:
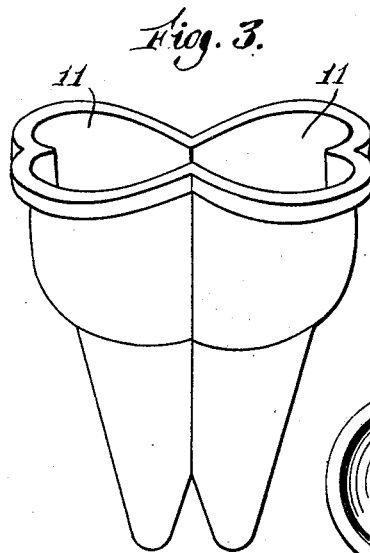
Figures 3, 4 and 5 show modifications.
Figure 4:
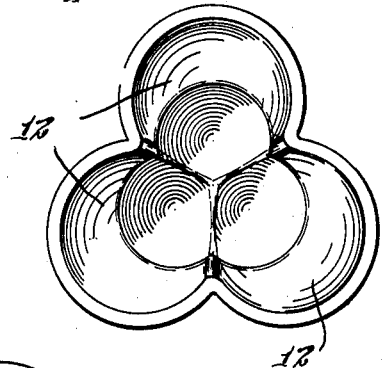
Figure 5:
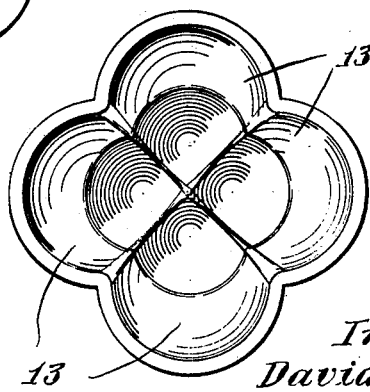

In the modification of Figure 3, the compartments are heart shaped as at 11 rather than circular as in Figure 1. In Figure 4 I have shown three compartments 12, and in Figure 5 I have shown four compartments 13.

In this application I lay claim only to the embodiments of my invention in which the generative centers of the stems are substantially inset from the generative centers of the bowl portions; the generic claims to the invention of a multi-cone constitute in part the subject-matter of my application filed February 28, 1930, Serial No. 432,167, to which the generic claims originally presented in this application have been transferred and continued.

Various other modifications in the shape and arrangement of the compartments and the general appearance of the cone may obviously be resorted to without departing from the spirit of the invention within the scope of the appended claims.

What I therefore claim and desire to secure by Letters Patent is:

1. An ice cream cone comprising a unitary molded shell shaped to present a plurality of contiguous but definitely formed open-topped closed-bottom compartments, said compartments at their top portions merging with each other and adapted to receive individual fillings of ice cream and to maintain such fillings in relative independent assembly during consumption of the cone, said shell beneath said compartments extending as individual closed bottom stems of reduced diameter constituting grasping portions having their generative centers substantially inset from the generative centers of their compartments.

2. An ice cream cone comprising a unitary molded shell shaped to present a plurality of contiguous but definitely formed open-topped compartments, said compartments at their top portions merging with each other and adapted to receive individual fillings of ice cream and to maintain such fillings in relative independent assembly during consumption of the cone, said shell beneath said compartments extending as individual closed bottom stems of reduced diameter constituting grasping portions having their generative centers substantially inset from the generative centers of their compartments, said stems being partially separated from each other along lines disposed in substantially the vertical axis of the cone as a whole.

In testimony whereof I affix my signature.

DAVID CANTER.